N. J. KEMP.
MANURE SPREADER.
APPLICATION FILED AUG. 10, 1916.
1,282,854. Patented Oct. 29, 1918.
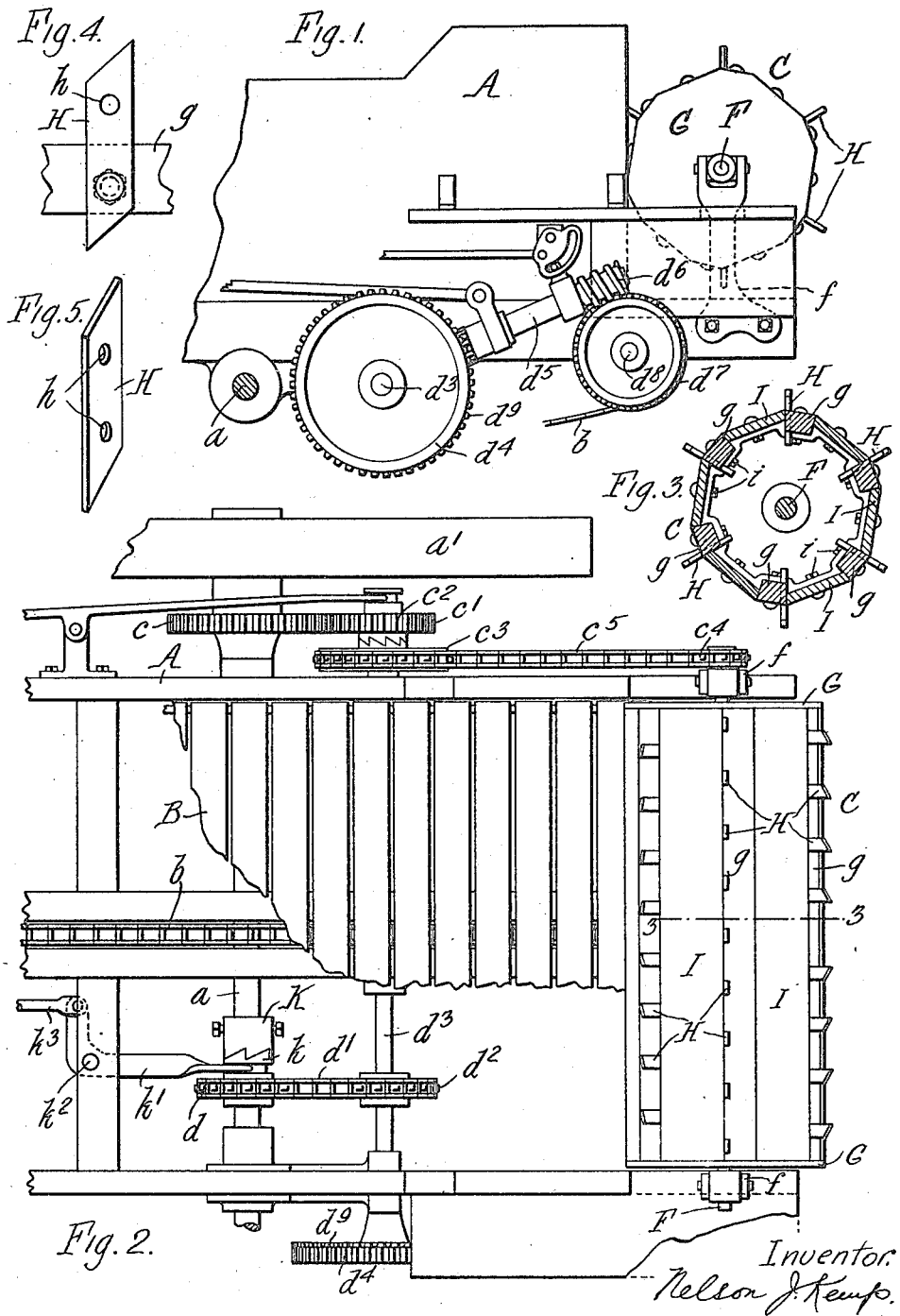
Inventor.
Nelson J. Kemp.
by Wilhelm & Parker.
Attorneys.

UNITED STATES PATENT OFFICE.

NELSON J. KEMP, OF LE ROY, NEW YORK.

MANURE-SPREADER.

1,282,854.    Specification of Letters Patent.    Patented Oct. 29, 1918.

Application filed August 10, 1916.   Serial No. 114,101.

*To all whom it may concern:*

Be it known that I, NELSON J. KEMP, a citizen of the United States, residing at Le Roy, in the county of Genesee and State of New York, have invented a new and useful Improvement in Manure - Spreaders, of which the following is a specification.

This invention relates to manure spreaders of the kind comprising a wagon body or receptacle for the material provided at its rear end with a rotary beater or distributer to which the material is fed by means of a movable apron or bottom in the receptacle and which distributes the material.

The objects of the invention are to simplify the construction of manure spreaders of this kind by providing a beater drum and beater teeth of improved construction; also to provide a machine of this kind with a clutch which makes it possible to stop the movable apron when desired, to relieve the spreader of strains; also to simplify and improve the construction and arrangement of the parts of the device in other respects hereinafter specified.

In the accompanying drawings:

Figure 1 is a fragmentary elevation of a manure spreader embodying the invention, showing the rear end thereof.

Fig. 2 is a fragmentary top plan view thereof.

Fig. 3 is a longitudinal section on line 3—3, Fig. 2, of the beater drum of the manure spreader.

Figs. 4 and 5 are respectively a face view and a perspective view of a beater tooth of the manure spreader.

A represents the usual wagon body or receptacle of the manure spreader and $a$ is the rear axle of the spreader on which the wagon body is mounted, one of the wheels $a'$ of the spreader being partially shown in Fig. 2. The material is fed to the rear of the wagon body or receptacle by means of the usual traveling feed apron B, Fig. 2, which is actuated by means of a central chain $b$ arranged below the bottom of the apron. The apron feeds the material to a beater C journaled at the rear of the machine and which is actuated from the axle $a$ by means of gears $c$ $c'$, a clutch $c^2$ and sprocket wheels $c^3$ $c^4$ connected by means of a sprocket chain $c^5$. The feeding of the material to the beater by means of the apron is accomplished by the usual train of gears connecting a winding drum or sprocket (not shown) at the rear of the machine with the driving axle of the spreader. In the construction shown, the feed apron is actuated by means of a sprocket wheel $d$ mounted on the driving axle $a$ and connected with a sprocket chain $d'$ to a sprocket wheel $d^2$ mounted on a countershaft $d^3$. A gear $d^4$ secured on this countershaft drives a shaft $d^5$ which is provided with a worm $d^6$ engaging a worm gear $d^7$ mounted on a shaft $d^8$ which is connected with the chain $b$ of the feed apron. The speed of rotation of the shaft $d^5$ may be varied in the usual manner by means of a plurality of bevel gear teeth $d^9$ on the side of the gear wheel $d^4$, with which an adjustable bevel gear on the shaft $d^5$ may be placed into engagement. Except as hereinafter specified, all of these parts may be of any suitable or usual construction.

The beater drum C is arranged slightly beyond the end of the wagon body or receptacle and is preferably constructed as follows:

The drum is mounted on a central shaft F journaled on brackets $f$ suitably secured on the frame of the spreader, and comprises two imperforate end plates or members G which are connected by means of a plurality of tooth-supporting bars $g$ extending substantially parallel with the shaft F on which the drum is mounted and transversely with regard to the spreader. H represents the beater teeth which extend beyond the periphery of the beater drum and which are secured to the bars $g$ by bolts or other suitable means which enable the teeth to be readily attached to or removed from the bars $g$. The spaces between the bars $g$ of the beater drum are closed by means of strips or panels I, which may, as shown, be removably secured in place by means of bolts or screws $i$. By means of this construction the periphery of the beater drum is entirely closed so that none of the material enters into the drum. The imperforate periphery of the drum makes it possible to dispense with the usual end gate or safety board heretofore employed in manure spreaders, since the periphery of the drum will prevent the material from passing out of the rear end of the receptacle except when fed out by the beater teeth.

In order to insure the proper feeding of the material by means of a closed drum, it is essential to provide beater teeth which are so proportioned and formed as to insure the proper feeding or distribution of the material. For this reason beater teeth like those shown in detail in Figs. 4 and 5 are preferably employed. These teeth are flat and comparatively short and are pointed at opposite ends and engage or scoop the material with their flat faces. These teeth are provided with two holes $h$ for bolts or the like, and are so made that either side and either end of each tooth can be used.

By using a drum with an imperforate periphery and flat comparatively short teeth, a better pulverizing and a more even distribution of the manure is obtained. The use of an imperforate drum prevents the feeding of lumps or large quantities of manure by the tooth-supporting bars, for example, when the machine is traveling up hill, as is done by machines in which the spaces between the bars are not closed. Since the material is only distributed from the machine by the flat faces of the beater teeth, a uniform distribution of material is insured, whether the spreader is going up or down hill. This result could not be obtained by means of narrow or round beater teeth heretofore used, since these teeth, when used on an imperforate drum, cut through the material without removing sufficient parts of the same from the mass of material in the receptacle. By the construction described, the rotation of the drum is greatly facilitated, hence lessening the draft required to actuate the spreader, since the flat teeth do not permit the material in the receptacle to pack against the drum. The need for an end gate in front of the drum, such as is required on manure spreaders having a skeleton drum, is also eliminated, since the escape of material when the spreader is being loaded, is prevented by the drum described. The spreader described distributes the material as soon as the beater drum is rotated, while in the spreaders employing an end gate, the spreader must travel a considerable distance before the material is fed by the apron to the beater drum. The improvements described therefore decrease the cost of construction of manure spreaders and also increase the efficiency and improve the operation of apparatus of this kind.

In order to facilitate the shifting of gears to vary the speed of the traveling feed apron, a clutch is preferably provided by means of which the feeding of the apron can be instantaneously stopped. For this purpose a clutch member K is rigidly secured on the driving axle $a$ of the spreader and a movable clutch face or member $k$ is rigidly connected with or formed on the hub of the sprocket wheel $d$, which is slidably mounted on the driving axle $a$. The sprocket wheel $d$ and clutch face $k$ are moved into and out of engagement with the clutch member K by means of a bell crank lever $k'$ pivoted at $k^2$, one end of which engages a groove in the hub of the sprocket wheel $d$ and the other end of which is connected with a link $k^3$ which may be actuated by a foot lever or other suitable means (not shown). By this clutch, the feed apron can be disconnected from the driving axle by the mere pressure of the foot or hand and the adjustable gear can be shifted as desired when the same is not in motion, which greatly increases the life of the gear and facilitates its shifting. By placing the clutch in the position described, relatively to the gears, the several gears of the train can be permanently secured in their proper positions, and are not interfered with by the actuation of the clutch, so that an efficient operation of the gear train is insured. The clutch described adds to the efficiency of the machine and to the ease with which the same can be operated.

I claim as my invention:

1. In a manure spreader, the combination of a receptacle for the manure, and a rotary beater drum arranged at the rear end of said receptacle and against which the manure is fed, said drum having a closed periphery and having teeth projecting from the face of the drum, said teeth having flat portions facing the direction of movement of the drum.

2. In a manure spreader, the combination of a receptacle for the manure, and a rotary beater drum arranged at the rear end of said receptacle, said drum comprising end portions, bars connected at their opposite ends to said end portions and extending transversely of the spreader, beater teeth secured to said bars, and removable means for closing the spaces between adjacent bars.

3. In a manure spreader, the combination of a receptacle for the manure, and a rotary beater drum arranged at the rear end of said receptacle, means for rotating said drum from the axle of the spreader, said drum comprising a plurality of bars extending transversely of the spreader and parallel to said axis, a plurality of teeth secured to said bars and having flat faces arranged to face the direction of rotation of said drum, and removable means for closing the spaces between adjacent bars.

Witness my hand this 7th day of August, 1916.

NELSON J. KEMP.

Witnesses:
F. E. PROCHNOW,
A. L. MCGEE.